_United States Patent_ [19]

Yang

[11] 4,103,760

[45] Aug. 1, 1978

[54] MECHANICAL SHOCK ARRESTOR

[75] Inventor: Elmer Chensheng Yang, Orange, Calif.

[73] Assignee: Pacific Scientific Company, Anaheim, Calif.

[21] Appl. No.: 866,097

[22] Filed: Dec. 30, 1977

Related U.S. Application Data

[63] Continuation-in-part of Ser. No. 776,397, Mar. 10, 1977, abandoned.

[51] Int. Cl.² ............................................. F16F 7/10
[52] U.S. Cl. .................................... 188/1 B; 74/89.1; 188/134
[58] Field of Search .............. 74/89.1, 89.15, 424.8 R, 74/424.8 B; 188/1 R, 1 B, 129, 134, 135; 248/54 R, 54 CS

[56] References Cited

U.S. PATENT DOCUMENTS

| Re. 29,221 | 5/1977 | Yang | 188/1 B |
| 3,701,401 | 10/1972 | Palma et al. | 188/134 |
| 4,054,186 | 10/1977 | Banks et al. | 188/1 B |

_Primary Examiner_—Duane A. Reger
_Attorney, Agent, or Firm_—Knobbe, Martens, Olson, Hubbard & Bear

[57] ABSTRACT

Relative axial motion of a pair of strut members is converted into rotation of a shaft which drive a rotatably mounted inertia element. Rotation of the shaft in the opposite direction drives a second rotatably mounted inertia element. The inertia elements are interconnected by a coil spring with the result that the inertia element driven directly by the shaft drives the other inertia element. At a predetermined acceleration, the inertia element driven by the spring will lag, and this changes the spring diameter causing the spring to engage a surrounding housing causing a braking action to limit the acceleration. In a second embodiment, the axial strut load is translated through a fixed shaft into rotation of a nut which drives the inertia element. The nut also transfers the axial load through the inertia element and a single ball bearing set to the other strut member.

12 Claims, 11 Drawing Figures

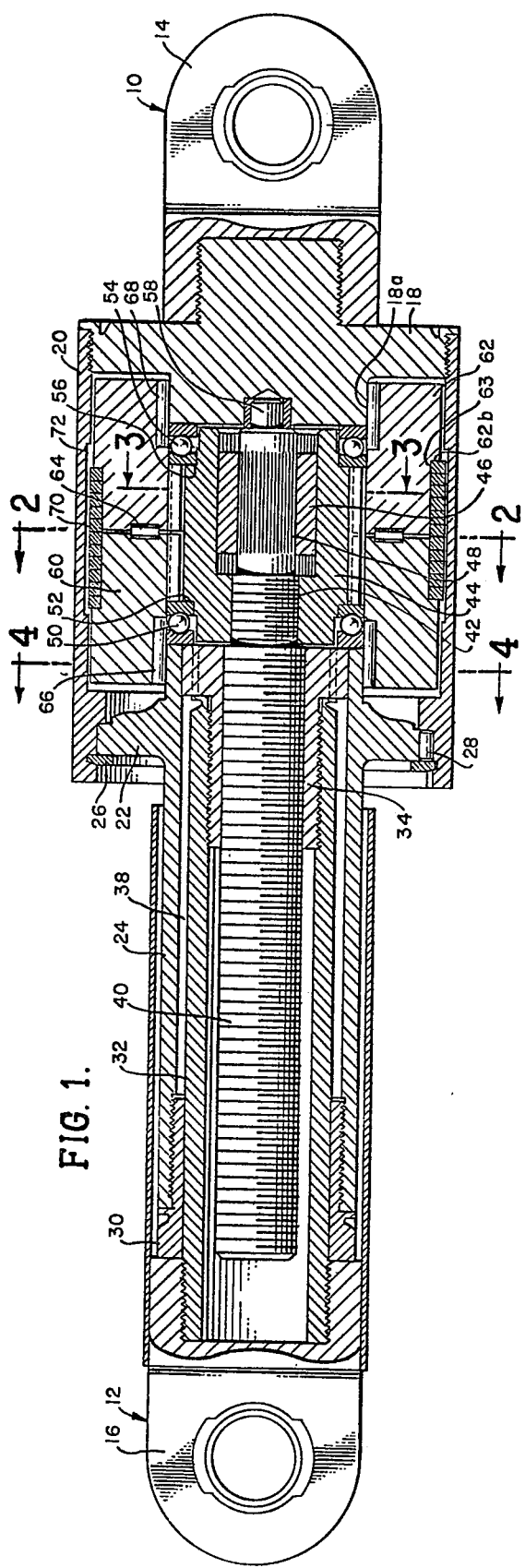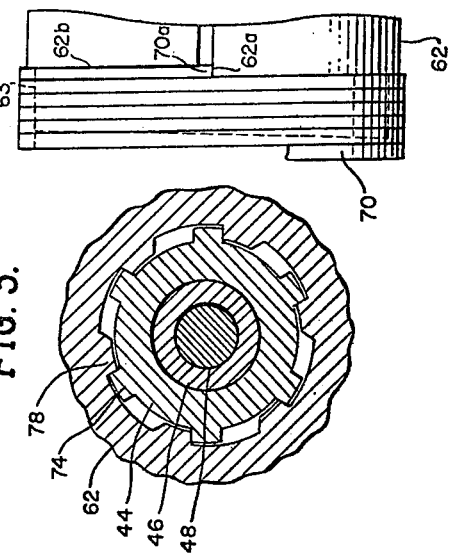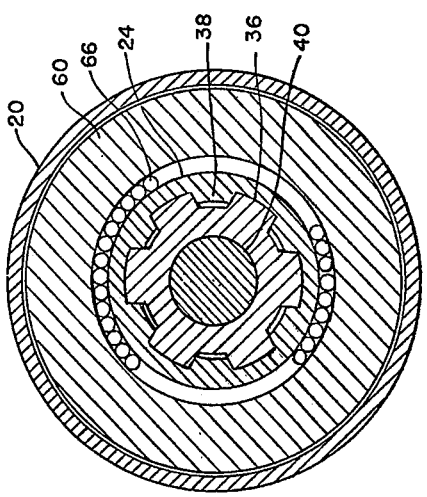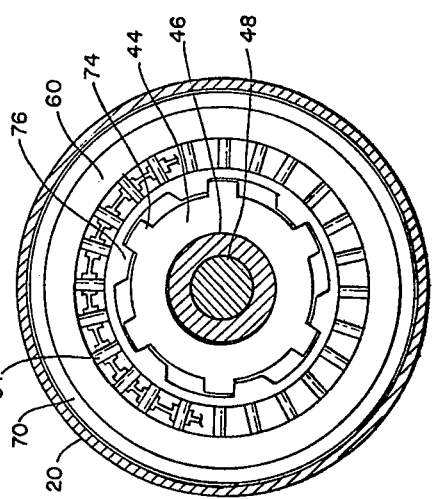

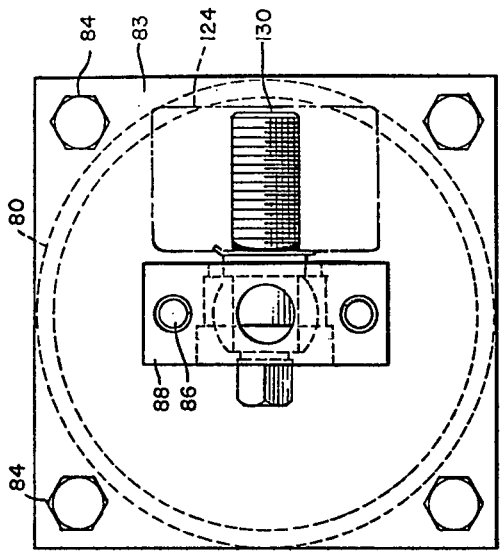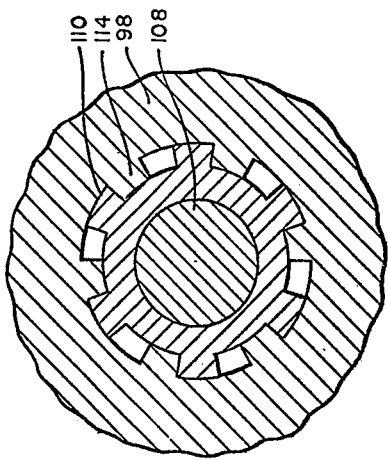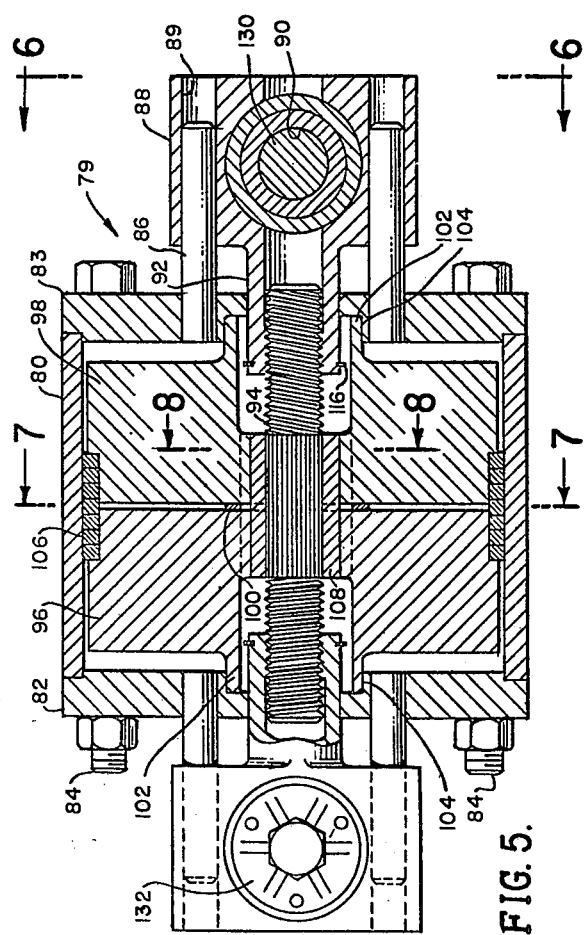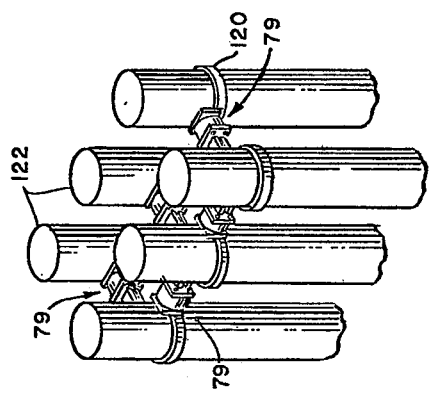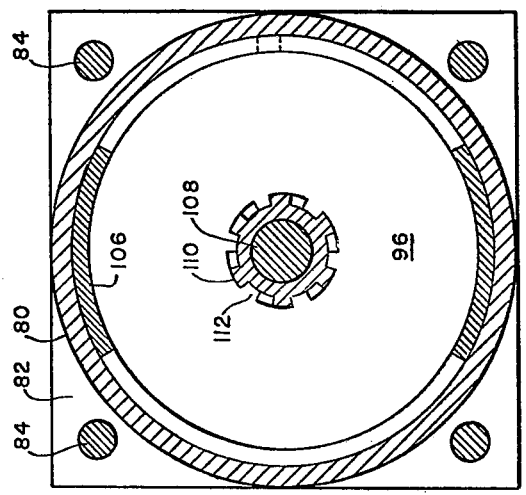

MECHANICAL SHOCK ARRESTOR

CROSS-REFERENCE TO RELATED APPLICATION

This invention is a continuation-in-part of co-pending U.S. patent application Ser. No. 776,397, filed Mar. 10, 1977.

This invention relates to apparatus for limiting acceleration of two relatively moving members to a predetermined threshold, and more particularly, to an improved all mechanical shock arrestor or motion snubbing device.

In U.S. Pat. No. 3,876,040, there is disclosed an acceleration sensitive motion snubber that is particularly useful in snubbing motion which occurs from earthquakes or other rapidly accelerating forces. Such devices permit slow acceleration such as that which occurs due to temperature changes but will prevent rapid acceleration while still permitting continued movement at the lower acceleration levels. The device shown in U.S. Pat. No. 3,876,040 is particularly useful in connection with atomic energy electric generating plants because it is highly reliable and is not affected by radiation, as are hydraulic snubbers.

The present invention relates to improvements in an acceleration sensitive mechanical shock arrestor of the general type disclosed in the above-mentioned patent. Such shock arrestor has been very successful, particularly in the smaller sizes. However, with struts for handling exceedingly large loads such as that which might be imposed on struts attached directly to major components within a nuclear reactor, the design shown in the above-mentioned patent can become larger than desired when having adequate strength. Thus, the present invention employs arrangements which are most compact and also highly reliable.

In accordance with the invention, a pair of members mounted for relative movement are connected to a pair of inertia elements which are mounted to be freely rotated. The connecting means between the members and the inertia elements is so arranged that relative movement of the members in one direction will only directly or positively drive one of the inertia elements and relative movement of the member in an opposite direction will only directly or positively drive the other inertia element. These inertia elements are in turn connected in a manner such that the element being rotated by the drive means will rotate the other inertia element. This second inertia element will sense the acceleration and will follow the first one below a predetermined motion threshold; but if acceleration is attempted beyond that threshold, this second inertia element will initiate a braking action to limit motion to said threshold.

In one form of the invention covered in the above-identified parent application, the inertia elements are cylindrical or somewhat disc shaped and are mounted coaxially with two of their ends in face to face relation. Motion is transmitted between the inertia elements by means of a coil spring which surrounds the interfacing portions of the elements. If the force applied to the inertia elements exceeds a predetermined acceleration threshold, the inertia of the elements being driven by the coil spring will cause the element to impose a lagging force on the springs which in turn will cause it to increase its diameter so that it will brake against a surrounding housing wall. This braking action prevents acceleration beyond the threshold.

In another form of the invention in the parent case, the axial length of a strut employing the acceleration sensitive means has been cleverly minimized. A very short strut is needed in certain applications such as interconnecting fuel rod support tubes in a nuclear reactor. In such an axially short snubbing device, the inertia elements are made axially short so that they are somewhat disc shaped. The drive shaft for rotating the inertia elements is formed with high lead threads on opposite ends which cooperate with members to be attached to the fuel rod tubes or other structure whose motion is to be arrested. These connecting members are slidably mounted for axial movement in the ends of a housing containing the inertia elements and the slidable mounting arrangement prevents rotation of the connecting members. The threaded connections between the members and the shaft are such that moving the connecting members towards each other will produce rotation of the shaft in one direction and moving the connecting members away from each other will rotate the shaft in the opposite direction. This is preferably accomplished by having the threads on opposite ends of the shaft extend in opposite directions. Thus, both connecting members and both ends of the shaft are involved in converting axial movement of the device into rotation of the inertia elements.

In a form of the invention scheduled for production, and which now appears to be the preferred form, axial movement of a fixed shaft on one strut member is transferred to the other member by being translated into rotaton of a nut; the nut in turn transfers the rotation and the axial load directly to an inertia element which transfers the axial load through ball bearings to the other strut member. Interengaging portions of the strut member surround the inertia members which increases the strength of the strut enabling it to handle lateral or side loads better than with a strut of reduced diameter.

For a more thorough understanding of the invention refer now to the following detail description and drawings in which:

FIG. 1 is a cross-sectional view on the longitudinal axis of a strut embodying one form of the invention;

FIG. 2 is a cross-sectional view on line 2—2 of FIG. 1;

FIG. 3 is a cross-sectional view on line 3—3 of FIG. 1;

FIG. 3a is a side elevational view illustrating the connection between an inertia element and the spring;

FIG. 4 is a cross-sectional view on line 4—4 of FIG. 1;

FIG. 5 is a cross-sectional view on the longitudinal axis of a strut embodying another form of the invention;

FIG. 6 is a view of the strut of FIG. 5 on line 6—6;

FIG. 7 is a cross-sectional view of the strut of FIG. 5 on line 7—7;

FIG. 8 is a cross-sectional view of the strut of FIG. 5 on line 8—8;

FIG. 9 is a schematic perspective view illustrating the strut of FIG. 5 in use.

Figure 10:
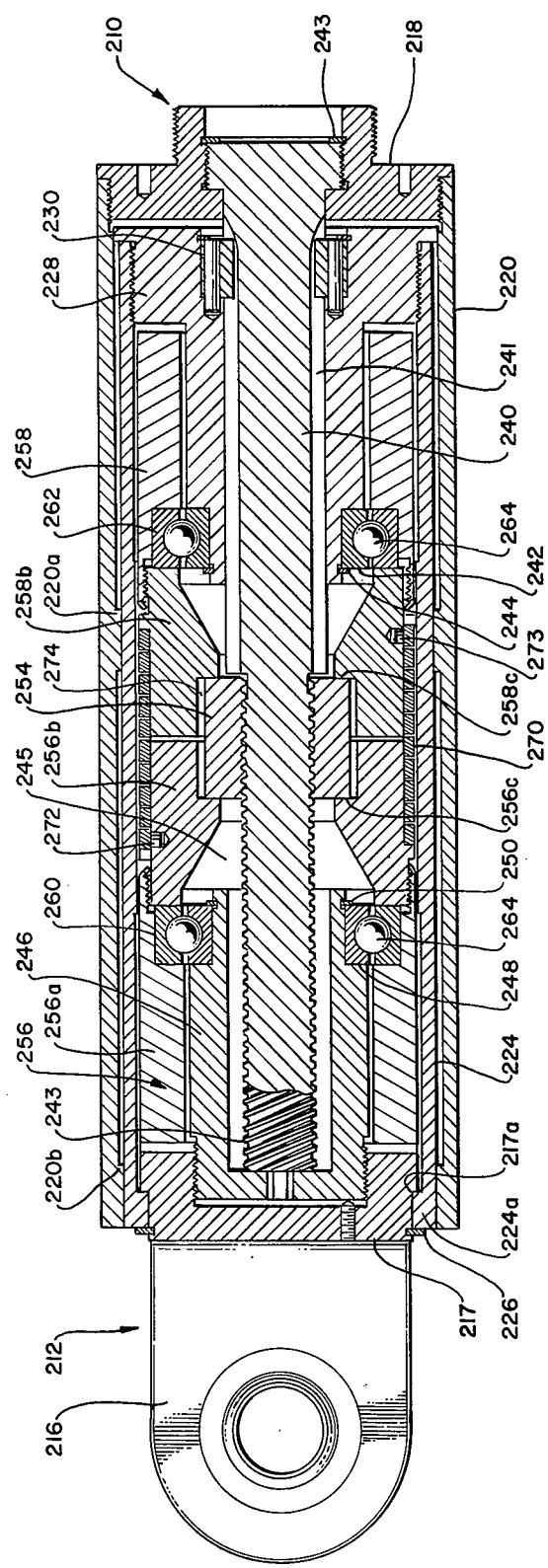
FIG. 10 is a longitudinal cross-sectional view of the form of the invention claimed herein. of FIG. 5 in use.

Referring now to FIG. 1, the shock arrestor shown includes a pair of support or connecting members generally indicated at 10 and 12 which are telescopically mounted on each other for relative axial reciprocation. These support members are formed of several different components which are rigidly connected to move as a unit. Thus, the support members 10 and 12 each include an end tongue 14 and 16, respectively, which are adapted to be connected to the structures whose relative motion is being arrested. The tongue 14 is threadably attached to a heavy disc shaped end plate which in turn is attached to a tubular or cylindrical housing 20.

Attached to the other end of the housing 20 is an end plate or flange 22 formed integral with a tube 24. The flange 22 is positioned against an annular shoulder in the housing wall 20 and is axially held in this position by a retaining ring 26. The flange 22 is also rotationally fixed with respect to the housing wall 20 by means of a series of pins 28, one of which is shown in FIG. 1.

The other end of the tube 24 is threaded to a tubular sleeve 30 which slidably receives an elongated support tube 32, which is threadably attached to the tongue 16 of the support member 12. Threadably attached to the interior of the other end of the tube 32 is a tubular nut 34 which has an outwardly extending flange on one end that has a plurality of radially extending lugs 36, as seen in FIG. 4. These lugs fit within axially extending grooves formed between splines 38 on the interior of the tube 24 which is attached to the support assembly 10. Thus, it can be seen that the telescopic movement of the assemblies 10 and 12 occurs by the tube 32 axially sliding within the tube 24 and its sleeve 30. The cooperation between the nut lugs 36 and the splined interior 38 of the tube 24 prevents rotation of the assemblies 10 and 12. The strut is shown in its fully telescoped position with the end of the sleeve 30 engaging the interior end wall of the tongue 16.

The interior of the tubular nut 34 is forme with a high-lead thread which mates with a high-lead thread formed on the exterior of the shaft 40 which extends within the tube 32 and into the housing 20. The portion of the shaft extending into the housing 20 has a section 42 with a slightly reduced diameter on which is threadably mounted a tubular load transfer member 44. The member 44 is rotationally and axially locked on the shaft by means of a plug sleeve 46 which is forced between an axially ridged bore in the member 44 and an axially ridged section 48 formed on the shaft 40.

As seen from FIG. 1, the shaft through its load transfer member 44 is rotatably mounted within the housing 20 on the support assembly 10. This is accomplished by means of a schematically illustrated bearing 50 which extends between the inner end of the tube 24 and an annular shoulder 52 formed on one end of the load transfer member 44. Similarly, a bearing 54 is positioned between the interface of the end plate 18 and an annular shoulder 56 formed on the other end of the load transfer member 44. The tip 58 of the shaft 40 is also rotatably mounted in the end plate 18; however, the axial load on the strut is carried on the bearings 50 and 54.

Between the housing wall 20 and the load transfer member 44, there is formed an annular cavity in which is positioned a pair of ring shaped or annularly shaped inertia elements 60 and 62. As may be seen from FIG. 1, these members are identical and they are axially aligned within the cavity. However, they are mounted in opposed relation with the end face of one closely positioned adjacent the similar end face of the other. A suitable roller bearing unit 64 is positioned in recesses formed in the opposing end faces to facilitate the rotation of the inertia elements with respect to the other. The inertia element 60 is further rotatably mounted by a roller bearing 66 positioned between the inner wall of the element 60 adjacent its axially outer end and the exterior of the tube 24 adjacent its end within the housing 20. Similarly, a bearing 68 is positioned between the inner wall of the inertia element 62 adjacent its axially outer end and the exterior of a cylindrical axial projection 18a on the end plate 18.

A coil spring 70 surrounds the portions of the inertia elements 60 and 62 adjacent their opposing ends. An annular recess 63 is formed in the elements 60 and 62 for receiving the spring. As may be seen from FIG. 1, the coil spring 70 is closely spaced from the surrounding housing wall 20. A shallow annular recess 72 may be formed in the wall 20 for receiving the coil spring with the desired spacing, although it is not critical.

The ends of the coil spring 70 are interconnected to the inertia elements 60 and 62 so that rotation of one inertia element will rotate the other element through the spring. More specifically one end 70a of the spring, as shown in FIG. 3a, engages a radial shoulder 62a formed on the inertial element 62. The shoulder 62 is created by forming the end wall 62b of the recess 63 in the inertia element 62 so that it conforms to the spirally sloping end surface of the spring 70. The other end of the spring 70 is similarly, though reversely, positioned with respect to the inertia element 60.

The load transfer nut 44 is formed with a plurality of axially and radially extending teeth or ribs 74 as may be seen in FIGS. 2 and 3 which define spaces between them. The inertia element 60 is similarly formed with inwardly extending ribs or teeth 76 which fit within the spaces between the teeth 74 on the load transfer nut; however, the spaces between the teeth 74 and the spaces between the teeth 76 are larger than the teeth positioned therein so that in the position shown in FIG. 2, one edge of each tooth 74 is engaged with one edge of each tooth 76 but the other edges of the teeth are spaced circumferentially a distance greater than the width of the teeth.

Referring to FIG. 3, the inertia element 62, being identical to the element 60 also has inwardly extending teeth 78 which engage the teeth 74. However, in this instance, it is the other edge of each tooth 74 which engages the edge of the teeth 78. This occurs because of the reversal of the elements 60 and 62. The location of the teeth 76 and 78 on the inertia elements is circumferentially oriented or related to the location of the radial shoulders on the inertia elements that are engaged by the ends of the coil spring 70 so that the load transfer nut teeth 74 are oriented with respect to the inertia element teeth as shown in FIGS. 2 and 3.

OPERATION

When an axial force is applied to the strut causing it to become shorter or longer, the axial force is applied to the shaft 40 by means of the nut 34. The high-lead threads of the nut and shaft will produce rotation of the shaft as the strut members 10 and 12 are axially moving relative to each other. The rotation of the shaft 40 of course, rotates the load transfer nut 44 which is attached thereto. Relative axial motion of the strut members in one direction will produce counterclockwise rotation, and the teeth 74 on the load transfer nut 44 will engage and drive the teeth 76 formed on the inertia element 60 as shown in FIG. 2. However, referring to FIG. 3, it can be seen that the load transfer nut does not drive the inertia element 62 with a counterclockwise rotation because the teeth 74 would tend to move away from the teeth 78.

Rotation of the inertia element 60 in a counterclockwise direction also rotates the coil spring 70 since the end of the spring engages the shoulder on the inertia element to cause such rotation. Rotation of the coil spring 70 in turn drives the inertia element 62 through the end 70a of the spring 70 engaging the shoulder 62a as shown in FIG. 3a. So long as the acceleration of the telescoping movement of the strut and the resulting rotation of the shaft and load transfer nut is slow, the inertia element 62 simply follows the movement of the inertia element 60 and the relationship of the components remains as illustrated in the drawings. Thus, the strut can accommodate slow movement such as that produced by the thermal expansion and contraction of the components and structures to which the strut is attached.

However, if the relative movement received by the strut approaches a predetermined acceleration threshold, the inertia of the inertia element 62 which is being rotated through the coil spring 70 will cause the element to lag rotationally because of the resiliency of the spring. This lagging rotation can be further understood by referring to FIG. 3 and visualizing the teeth 74 moving in a counterclockwise direction away from the teeth 78. The lagging movement of the inertia element 62 introduces a force or load which trys to compress the spring 70 along its spiral axis which causes the diameter of the coils to expand and frictionally engage the inner surface of the housing wall 20. This frictional engagement produces a braking action which limits the acceleration of the inertia elements, which in turn brakes or restricts the rotation of the load transfer nut and the shaft 40. Referring to FIG. 3, the width of the slots between the teeth is such that the lagging movement of the inertia element 62 can be accommodated without the teeth 78 interfering with the teeth 74.

When the accelerating force attempting to cause movement beyond the acceleration threshold is snubbed, the coil spring can relax and return the inertia element 62 to its normal position in relation to the load transfer nut 44 as shown in FIG. 3. The telescoping movement of the strut does not stop with this braking action produced by the coil spring and the inertia elements. Instead, the motion continues but at an acceleration rate which is below the predetermined threshold.

If the telescoping force on the strut is such as to produce rotation of the shaft 40 in the opposite or clockwise direction, the operation of the strut is the same with the exception that the inertia element 62 becomes the element positively or directly driven by the load transfer nut and the inertia element 60 is driven through the coil spring. More specifically, the teeth 74 on the load transfer nut positively drive the teeth 78 on the inertia element 62 as shown in FIG. 3. This force is then in turn transferred to the coil spring 70 by virtue of the shoulder 62a on the inertia element shown on FIG. 3a engaging the end of the coil spring 70. The spring then drives the element 60. Thus, it can be seen that the load transfer nut positively drives either of the inertia elements depending upon the direction of rotation but it only positively or directly drives one of them at a time, and the element not directly driven by the load transfer nut is instead rotated by means of the coil spring.

EMBODIMENT OF FIGS. 5 – 9

The embodiment of FIGS. 5 – 9 is similar to that of the embodiment of FIGS. 1 – 4 in that it employs a pair of inertia elements selectively driven by a rotating shaft and interconnected by a coil spring. However, the structure is otherwise greatly modified and simplified to form a very compact and axially short strut 79 having a minimum number of parts. There is shown a tubular or cylindrical housing 80 clamped between a pair of end plates 82 and 83 by a plurality of bolts 84 extending through the corners of the plates.

Attached to and extending outwardly from the end of each plate is a pair of guide pins 86. A pair of identical support or attachment members 88 are slidably mounted on the guide pins 86 for axial movement while being prevented from rotation. The members 88 are each provided with a pair of bores 89 for receiving the guide pins 86. The members 88 are further provided with an opening 90 through which connection is made to the structure whose motion is being snubbed or arrested. Each of the members 88 is further provided with a tubular extension 92 which extends into the end plates 82 and 83. The tubular extensions are internally threaded to mate with the threads on the end of a shaft 94 which extends through the housing coaxial with the cylindrical wall 80. The threads on the tubular extensions 92 and on the ends of the shaft 94 are of the high-lead type so that axial movement of the members 88 will produce rotation of the shaft. Note from FIG. 5 that the threads on one end of the shaft are left-hand and the threads on the other end of the shaft are right-hand. With this arrangement, the end members 88 can have the identical internal thread and movement of the members 88 towards each other will produce rotation of the shaft 94 in one direction and movement of the members 88 away from each will rotate the shaft 94 in the opposite direction.

Positioned within the housing 80 are a pair of inertia elements 96 and 98 which have a generally tubular or ring shape surrounding the shaft 94. The inertia elements 96 and 98 are rotatably mounted, but this is accomplished without the use of any roller or ball bearings. The inertia elements 96 and 98 are identical in shape and are axially aligned. However, they are positioned with their similar faces in opposing relation. A washer or ring shaped spacer 100 extends between these opposing faces to give them a slight clearance and keep the inertia element 96 and 98 on the relative center of the shaft 94. The housing is also thereby centrally positioned between the members 88. The other axial ends of the inertia elements are formed with axially extending tubular portions 102 which fit within sockets 104 formed in the end plates 82 and 83. The tubular portions 102 and the sockets 104 provide bearing surfaces for the inertia elements which rotationally and axially position the elements.

A spirally shaped coil spring 106 is positioned within annular recesses formed on the exterior of the inertia elements adjacent the opposing faces. The ends of the coil spring engage shoulders, (not shown) on the inertia elements in a manner similar to that explained in connection with the embodiment of FIGS. 1 – 4. The outer periphery of the coil spring 106 is closely spaced from the inner surface of the cylindrical wall 80.

A load transfer nut 108 is fixed to the central section of the shaft 94 to rotate with the shaft. As with the arrangement of FIGS. 1 – 4, the load transfer nut 108 is provided with a plurality of radially extending teeth 110 which cooperate with radially extending teeth formed on the inertia elements 96 and 98. More specifically, the teeth 110 of the load transfer nut are oriented to drivingly engage the teeth 112 of the inertia element 96 when the load transfer nut is rotated in a counterclockwise direction as viewed in FIG. 7. By contrast, the teeth 110 will drive the teeth 114 on the inertia element 98 when the load transfer nut 108 is rotated in the opposite or clockwise direction, as shown in FIG. 8.

OPERATION

It will be apparent that movement of the end members 88 towards each other will permit the members 88 to slide towards the end plates on the guide pins 86. This movement will rotate the shaft 94 in one direction due to the threads on the shaft and the members 88. If the motion is in, say, a counterclockwise direction, the load transfer nut 108 will positively drive or rotate the inertia element 96 in a counterclockwise direction as shown in FIG. 7. Element 96 will in turn rotate element 98 by means of the coil spring 106. So long as the acceleration remains below a predetermined threshold, the inertia elements will simply rotate as the strut telescopes. However, if acceleration reaches the predetermined threshold, the inertia element 98 will lag by virtue of its resilient connection through the coil spring and will cause the coil spring diameter to expand and frictionally engage the cylindrical wall 80 producing a braking action on movement.

As with the embodiment of FIGS. 1 - 4, movement of the strut members in the opposite direction will produce the opposite rotation of the shaft 94. This in turn will cause the load transfer nut 108 to drive the other inertia element 98 by movement in the clockwise direction as shown in FIG. 8. The inertia element 96 then becomes the element driven through the coil spring 106 and the combination of the spring and the element 106 will sense the acceleration threshold to prevent acceleration beyond the threshold.

The device in FIG. 5 is particularly useful in situations wherein there is very limited axial space in which to position a snubber. An example of this is in connection with the fuel rod guide tubes within a power generating nuclear reactor. It has been determined that it is desirable from a safety standpoint to interconnect the fuel rod tubes with devices which will snub or arrest rapidly ocllitating forces such as that which might occur during an earthquake. The amount of relative movement which the device will be subjected to as a result of normal thermal changes is quite small, and thus the travel of the attachment members 88 with respect to the housing is limited, as determined by the quide pins 86 and retaining rings 116 positioned on the exterior of the tubular extension 92 on the attachment members 88.

The snubbing device of FIG. 5 is shown in FIG. 9 connected to such nuclear reactor fuel rod tubes. More specifically, there is shown a mounting bracket or structure 120 attached to a plurality of vertically oriented, closely spaced, parallel fuel rod tubes 122. The attachment bracket 120 has an outwardly extending lug 124 as best seen in FIG. 6, on which is mounted a stud 130. The snubbing device is positioned so that the stud 130 extends through the hole 90 in the connecting member 88. A suitable retaining element 132 fitting over the stud is shown on the other end of the device in FIG. 5. Thus, several snubbing devices 79 may be attached between a group of fuel rod tubes as shown in FIG. 9 to provide the necessary capability for preventing the fuel rods from whipping violently and dangerously during rapid movement such as that in an earthquake.

EMBODIMENT OF FIGURE 10

FIG. 10 shows a variation of the arrangement shown in FIGS. 1 - 4. The form of the invention shown in FIG. 10 is scheduled for production and hence, is presently the preferred form. The shock arrester shown includes a pair of strut members generally indicated at 210 and 212 which are telescopically mounted on each other for relative axial reciprocation. These strut members are formed of several different components which are rigidly connected to move as a unit. Thus, the support member 210 includes an end tongue (not shown) adapted to be connected to the structure whose relative motion is being arrested. Such tongue is threadably attached to a heavy disc-shaped end plate 218 which in turn is threaded to a tubular or cylindrical housing or casing 220 having inner bearing surfaces 220a and 220b. Fixed to the end plate 218 is an elongated shaft 240 which extends through a central opening in the end plate 218 and is threaded on the exterior of an enlarged head which mates with internal threads formed on the bore through the end plate. A retaining element 241 further locks the shaft in position.

The support member 212 includes an enlarged tongue 216 which is formed with an end plate 217. Surrounding the end plate and sliding within the tubular casing 220 is an elongated tubular housing member 224. The housing 224 is axially fixed to the end plate by a flange 224a which is captured between a shoulder 217a on the end plate and a retaining ring 226. This arrangement permits the tongue 216 to be rotated for alignment purposes in mounting. The other end of the tube 224 is threaded on its interior and mates with a tubular bearing support member 228. The bearing support member 228 includes an enlarged end portion or plate which mates with the tube 224 and further includes a tubular portion of reduced diameter which surrounds the shaft 240. Pinned in a recess in the right end of the bearing support member 228 is a spline follower 230 having a plurality of circumferentially spaced grooves which slidably mate with axially extending spline teeth 241 on the exterior of the shaft 240. This spline teeth and groove arrangement permits axial movement of one strut member relative to the other but prevents relative rotation.

On the other end of the bearing support member 228 is positioned a bearing race 242, which is held in place by a retaining ring 244. Thus, it can be seen that the bearing support member 228 along with the bearing race 242 and the spline follower 230 are fixed to the tubular member 224 which is attached to the mounting tongue 216. In addition the strut member 212 includes a bearing support member 246 on the strut left end which is threadably attached to internal threads on a recess in the support plate 217. This bearing support member 246 like the support member 228 carries a bearing race 248 on the exterior surface of the inner end of the member and is held in position by a retaining ring 250. Thus, the strut member 12 forms a closed end structure which can slide axially relative to the strut member 210.

Positioned within the housing 224 is a torque transfer nut 254 which is threadably mounted on the threads 243 on the shaft 240. The threads on the shaft and the mating threads on the torque transfer nut 254 are of the high-lead type such that axial movement of the shaft 240 relative to the transfer nut will cause the nut to rotate.

Surrounding the transfer nut 254 and extending within the annular space formed by the bearing supports 246 and 228 in combination with the surrounding housing 224 are a pair of elongated inertia elements 256 and 258. The inertia element 256 is actually formed of two components, a central portion 256a, which is threaded to an end portion 256b. The element 258 is similarly formed with the portions 258a and 258b. Captured between the two portions of each inertia element are bearing races 260 and 262 which mate with the races 248 and 242 respectively. Large ball bearings 264 are mounted within the bearing races.

As can be seen, the inertia element portions 256b and 258b have annular recesses on their radially inner surfaces, that open to their opposing axial faces, and which together define a recess for axially capturing the torque transfer nut 254. The torque transfer nut 254 has a circular exterior cross-section that is separated radially by an annular space 274 from the surrounding circular walls of the inertia elements 256 and 258. The torque transfer nut is axially confined by the annular shoulders 256c and 258c on the interia elements. However, there is a slight clearance between the shoulders and the torque transfer nut so that one inertia element can rotate relative to the torque transfer nut when the other element is being driven by the nut.

Surrounding the adjacent ends of the inertia elements 256 and 258 is a coil spring 270 similar to the spring 70 in FIG. 1. The ends of the coil spring 270 mate with shoulders on the inertia elements in a manner similar to that described in connection with FIG. 3a. In addition, one end of the spring 270 is restrained by a screw or pin 272 which extends with slight clearance into a hole in the inertia element 256 which permits the spring to wind and unwind but yet prevents the components from separating. A similar screw or pin 273 extends into a hole in the inertia element 258.

In operation of the strut of FIG. 10, the overall result obtained is similar to that of the strut in FIG. 1. However, there are a number of operational and structural differences that provide certain advantages. The strut is shown in its most fully collapsed position. If a tension load is applied to the strut, the load is transmitted directly through the shaft 240 and the torque transfer nut 254 into the shoulder 258c of the inertia element 258. The load path is through the ball bearings 265 and into the bearing support member 228, the surrounding housing 224, and the tongue 216 of the support member 212.

Since the nut 254 is axially engaging the inertia element 258 and cannot move further axially in that direction, the high lead thread connection with the shaft causes the nut 254 to rotate which in turn rotates the inertia element 258 through the friction of the interengaging axial surfaces on the nut and the the inertia element. The inertia element 258 which is driven by the nut 254 rotates the spring 270, which in turn rotates the inertia element 256. A slight axial clearance between the nut and the inertia element 256 being driven by the spring permits the spring driven element to rotate independently of the nut and the inertia element 256. When rotation of the nut 254 and the inertia elements is below a predetermined acceleration level, the rotating components have no significant effect on the telescoping movement of the strut. However, with acceleration beyond a predetermined threshold, the inertia of the element being driven through the coil spring causes the spring to unwind a small amount such that the diameter of the spring increases causing the spring to brake against the interior of the surrounding support housing 224, thus, imposing a braking force on the telescoping strut. As soon as the acceleration is braked, the spring diameter will relax to its normal condition.

With the strut in compression the load is again through the shaft and the nut but it passes from the nut through the inertia element 256 and ball bearing 264 into the strut member 212. The compression load rotates the nut which rotates the element 256, that in turn drives the element 258 through the spring 270. The braking action at the threshold acceleration is comparable to that which occurs with a tension load.

One of the advantages of the arrangement of FIG. 10 is that only a single set of large ball bearings is required for each inertia element. Such bearings handle both the radial forces and the axial thrust forces. The size of the bearings are such that the very large thrust components can be accommodated. The large single sets of bearing also provide considerable manufacturing convenience in that they are easier to install than the small roller bearings shown in FIG. 1.

The use of the large ball bearing enables the nut 254 to transmit the axial load directly to one of the inertia elements and enables the nut to rotate the inertia element without the need for teeth connecting the nut to the inertia elements as in FIG. 1. This eliminates lost angular motion between the components. Also, the manufacture and assembly is simplified. Further, the number of components is minimized in that the nut 254 serves the function of translating the axial force of the strut into rotation, in combination with the shaft as well as the device which transfers the torque to the inertia elements. This is in contrast with the arrangement of FIG. 1 wherein the rotating shaft was used and one threaded member was used for rotating the shaft and a torque transfer nut was attached to the shaft for rotating the inertia element.

Another advantage of the arrangement of FIG. 10 is that the reciprocating strut components are of relatively large diameter throughout the length of the strut. This enables the strut to withstand lateral forces more effectively than can a strut of smaller diameter. Yet the overall size of the structure is not prohibitive in terms of installation problems in that the radial thickness of the tubular members forming the strut is not large relative to the overall diameter of the strut.

What is claimed is:

1. A motion snubbing device comprising:
first and second strut members mounted for relative movement;
a pair of inertia elements rotatably mounted on said first strut member;
a threaded shaft fixed to said second strut member;
a nut mounted on said shaft to be rotated by the shaft when the shaft is moved axially relative to said nut;
means connecting said nut to said elements so that relative movement of said members in one direction will drive one of said inertia elements, and relative movement of said members in an opposite direction will drive the other inertia element; and
means connecting said inertia elements in a manner such that rotating either of the elements below a predetermined motion threshold causes such element to rotate the other inertia element, and attempting to rotate said other inertia element above said threshold initiates braking action on said elements and said members which limits motion to said threshold.

2. The device of claim 1 wherein said inertia elements have means for axially restraining said nut.

3. The device of claim 1 wherein said inertia elements include tubular portions which are axially aligned in end to end relation with each of said portions having an annular, inner shoulder forming an annular recess in which said nut is positioned so that axial loads applied to said shaft are transmitted through said nut and into one or the other of said inertia elements depending on whether the strut is in tension or compression and the inertia element engages by the nut is frictionally rotated by the nut through the interengaging axial surfaces.

4. The device of claim 3 including a set of ball bearings mounting each of said inertia elements on said first strut member arranged to receive the axial load on said strut members as well as the radial load of the rotation of said inertia elements.

5. The device of claim 4 wherein said first strut member includes a pair of spaced end plates each having a tubular bearing support with one of said ball bearing sets being mounted on the exterior of each of said bearing supports, and with each of said inertia elements surrounding a respective one of said bearing supports, and said first strut member further includes a tubular housing surrounding said inertia elements and fixed to said end plates, and wherein said shaft extends through one of said end plates.

6. The device of claim 5 wherein said second strut member includes an end plate to which said shaft is fixed, and a tubular casing attached to said second strut end plate and surrounding said housing of said first strut member.

7. A motion snubbing device comprising:
a first strut member including a tubular support housing and an end plate attached to each end of said housing, and a tubular bearing support attached to each end plate which extends into said housing toward the other of said bearing supports, the housing being spaced from the bearing supports to define an annular space;
a second strut member including an end plate and a tubular casing attached to said end and slidably mounted on said housing, a threaded shaft attached to said end plate of said second strut member and extending through one of the end plates on said first strut member and through said bearing supports, means on the end plate through which the shaft extends for supporting said shaft for axial movement while cooperating with the shaft to prevent rotation of the shaft;
a pair of tubular inertia elements positioned within said housing annular space in end to end relation, bearing means rotatably mounting each of said elements on a respective one of said bearing supports;
means for translating axial movement of said shaft relative to said first strut member into rotation of one of said inertia members; and
means connecting said inertia elements in a manner such that rotating one of said elements in one direction causes such element to rotate the other of said inertia elements below a predetermined motion threshold, and attempting to rotate either of said elements above said threshold initiates braking action on said inertia elements and said strut members.

8. The device of claim 7 wherein the means connecting said inertia elements comprises a coil spring surrounding the inertia elements adjacent the inner wall of said housing, said inertia elements and said spring being arranged such that attempting to rotate an inertia element above said threshold will cause the spring diameter to increase and frictionally engage the wall of the surrounding housing to produce said braking action.

9. The device of claim 7 wherein said translating means comprises a nut mounted on said shaft and axially restrained by said inertia elements to axially engage and rotate one or the other of said inertia elements depending upon whether the strut is under compression or tension.

10. A motion snubbing device comprising:
first and second strut members mounted for relative movement;
a pair of inertia elements rotatably mounted on said first strut member in axially spaced relation;
load transfer means captured between said inertia elements axially engaged by one of said inertia elements while the other element is free to rotate relative to said load transfer means;
means for transmitting the axial load on said strut members through said load transfer means and for translating some of the axial load into rotation of said load transfer means and rotation of the inertia element axially engaged by said load transfer means; and
means connecting said inertia elements in a manner such that rotating either of the elements below a predetermined motion threshold causes such element to rotate the other inertia element, and attempting to rotate the other inertia element, and attempting to rotate said other inertia element above said threshold initiates braking action on said elements and said members which limit motion to said threshold.

11. The device of claim 10 wherein said load transfer means includes a nut axially captured between said inertia elements, and said transmitting and translating means includes a shaft on which said nut is mounted, said shaft being connected to receive the axial load on said strut and to cause rotation of said nut.

12. The device of claim 10 wherein said inertia elements are tubular elements axially aligned in end to end relation, and said load transfer means includes an internally threaded nut which is axially captured between opposing axially faces of said elements.

* * * * *